United States Patent [19]

Messinger

[11] Patent Number: 5,163,748
[45] Date of Patent: Nov. 17, 1992

[54] ILLUMINATED CLIPBOARD

[76] Inventor: David L. Messinger, 5929 Ave T, Galveston, Tex. 77551

[21] Appl. No.: 835,413

[22] Filed: Feb. 14, 1992

[51] Int. Cl.$^5$ .............................................. A47B 19/00
[52] U.S. Cl. ........................................ 362/98; 362/31; 40/546
[58] Field of Search ................. 362/31, 98, 99, 251, 362/156, 100, 97, 223, 800, 812; 248/452; 40/546

[56] References Cited

U.S. PATENT DOCUMENTS

| | | | |
|---|---|---|---|
| 1,898,666 | 2/1933 | Isaacson | 362/98 |
| 2,358,203 | 9/1944 | Best | 362/31 |
| 2,955,194 | 10/1960 | Clyne | 362/99 |
| 3,297,862 | 1/1967 | Levy et al. | 362/99 |
| 3,500,034 | 3/1970 | Bissell | 362/31 |
| 3,694,644 | 9/1972 | Bauknight | 362/99 |
| 3,808,415 | 4/1974 | Hurst | 362/99 |
| 3,892,959 | 7/1975 | Pulles | 362/31 |
| 4,153,927 | 5/1979 | Owens | 362/99 |
| 4,266,164 | 5/1981 | Schroeder | 362/98 |
| 4,564,887 | 1/1986 | Kier | 362/99 |
| 4,616,295 | 10/1986 | Jewell et al. | 362/31 |
| 4,751,615 | 6/1988 | Abrams | 362/31 |
| 5,083,242 | 1/1992 | Piotrowski | 362/31 |

Primary Examiner—James C. Yeung
Attorney, Agent, or Firm—H. Jay Spiegel

[57] ABSTRACT

An illuminated clipboard is disclosed having a transparent board to which is attached a housing carrying a pivotable clip. The board has double beveled edges designed to enhance internal light reflections from sources of light mounted on one end of the board and embedded within it. The housing not only carries the pivotable clip but also includes a clock device and battery powered electrical circuitry designed to not only operate the above-mentioned light sources but also to operate a further light source.

14 Claims, 3 Drawing Sheets

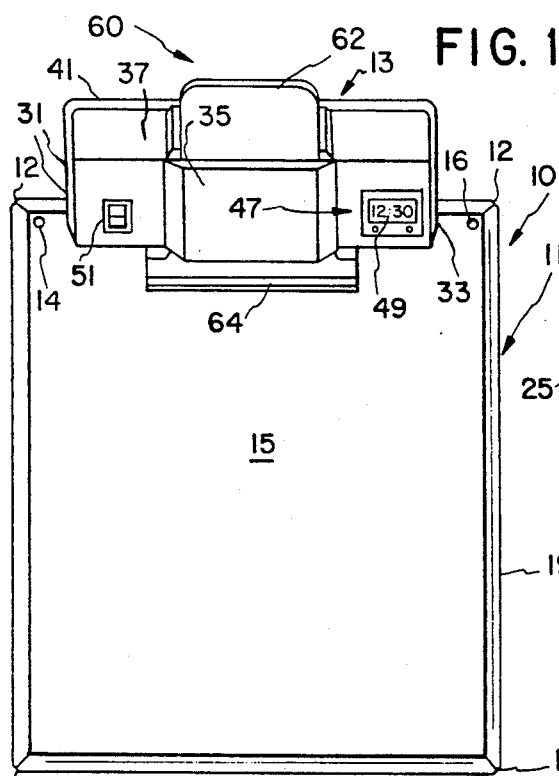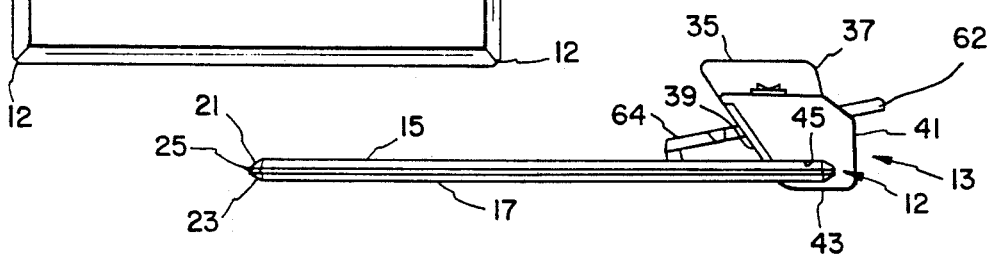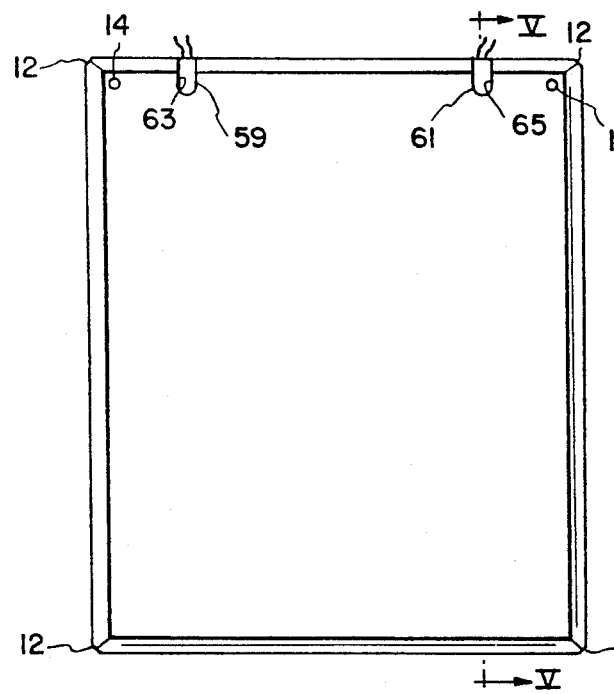

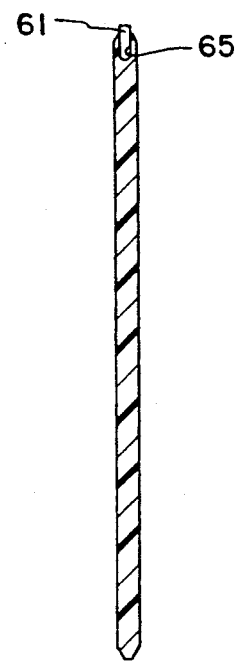
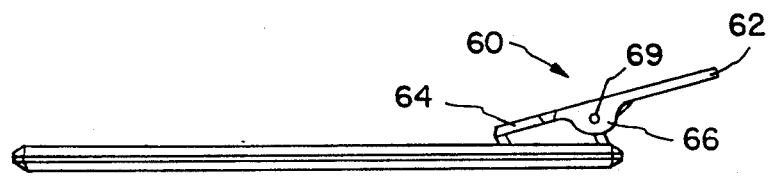
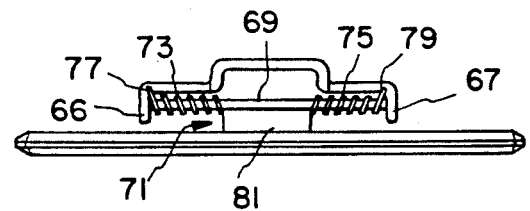
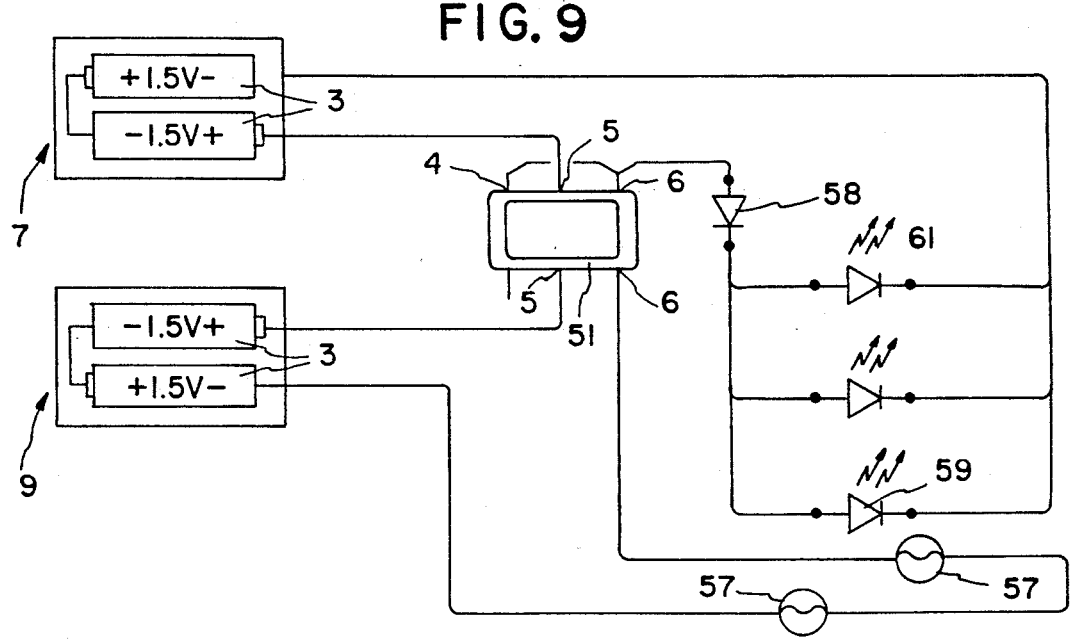

ILLUMINATED CLIPBOARD

BACKGROUND OF THE INVENTION

The present invention relates to an illuminated clipboard. In the prior art, clipboards of various designs are known including clipboards having illumination means associated therewith. However, Applicant is unaware of any clipboard having all of the features and aspects of the present invention.

The following prior art is known to Applicant:

U.S. Pat. No. 1,898,666 to Isaacson discloses a combination book rest and stand including illumination means attached thereto. The present invention differs from the teachings of Isaacson as contemplating a clipboard made of a transparent material and which is both internally lighted and externally lighted.

U.S. Pat. No. 2,358,203 to Best discloses an illuminating device including a transparent plate to which is attached illumination means. Best discloses distribution of light in such a manner that an object such as a book located below the plate will be illuminated thereby. The present invention differs from the teachings of Best as contemplating structure facilitating internal illumination of the clipboard portion thereof with minimal light leakage.

U.S. Pat. No. 2,561,885 to Prideaux et al. discloses an illuminated dial including an opening in which a light source is disposed (FIG. 3). The present invention differs from the teachings of Prideaux et al. as including edge structure on the clipboard portion thereof designed to maximize internal reflections and to substantially prevent light leakage. Such structure is no where taught or suggested by Prideaux et al.

U.S. Pat. No. 2,955,194 to Clyne discloses an illuminated writing board including two light sources, one of which is designed to shine on the surface of the board and the other of which may be shined elsewhere. The board itself is disclosed as being made of "appropriate material". The present invention differs from the teachings of Clyne as disclosing a transparent plastic clipboard which is internally lighted by illumination means embedded therein along with edge structure on the clipboard designed to enhance internal reflections therein.

U.S. Pat. No. 3,500,034 to Bissell discloses an illuminated reading device including a lens attached to illumination means, which device is designed to be placed in overlying relation to, for example, a book page. The structure of Bissell, particularly shown in FIG. 4 thereof, is designed to cause light from the light source 32 to shine below the lens 12. The present invention differs from the teachings of Bissell as contemplating structure specifically designed to cause light to be contained within the confines of a clipboard.

U.S. Pat. No. 3,694,644 to Bauknight discloses a clipboard illuminator including a housing structure having illumination means designed to shine on the surface of a clipboard 12. The present invention differs from the teachings of Bauknight as contemplating internal illumination of a clipboard.

U.S. Pat. No. 4,153,927 to Owens discloses a multi-function clipboard apparatus including an illumination device designed to illuminate the surface of the clipboard and a further diverse illumination means 70. The present invention differs from the teachings of Owens as contemplating an internally illuminated transparent clipboard.

U.S. Pat. No. 4,266,164 to Schroeder discloses an electroluminescent backing sheet for reading and writing in the dark. The device includes a plurality of light strips which form an integrated light field. The present invention differs from the teachings of Schroeder as contemplating a clipboard made of a plastic material which clipboard is internally lighted by conventional illumination means combined with peripheral structure of the transparent clipboard.

U.S. Pat. No. 4,564,887 to Kier discloses a lighted notepaper tray including external illumination means designed to illuminate over the tray. The present invention differs from the teachings of Kier as contemplating an internally lighted transparent clipboard.

U.S. Pat. No. 4,751,615 to Abrams discloses a page light which includes a plate of wedge-shaped cross-section having one edge with a double bevel and an arcuate cut portion designed to expose light to the interior of the plate. The present invention differs from the teachings of Abrams as contemplating a clipboard having parallel major faces with double beveled edges about the entire periphery thereof and illumination means embedded therein. Additionally, Abrams contemplates coating the peripheral edges of the board thereof with a reflective material. In contrast to this, due to the beveled edges completely about the periphery of the inventive board, such coating is not necessary.

SUMMARY OF THE INVENTION

The present invention relates to an illuminated clipboard. The present invention includes the following interrelated objects, aspects and features:

(A) In a first aspect, the present invention includes a transparent plastic clipboard made of a material such as, for example, LUCITE. The entire periphery of the board has a double beveled edge coming to a point about the periphery of the board at the midpoint of its thickness. The double beveling is at an angle specifically designed to enhance internal reflections of light within the board and to substantially prevent light leakage. The double beveled edges of the periphery of the board combine together to comprise a prism with light impinging on the surfaces of the prism from within the clipboard so impinging at angles greater than the "critical angle" so that substantially total reflection and substantially zero light leakage occur.

(B) A housing is mounted at one end of the board with the housing carrying a pivotable clip with an actuator handle designed to be manipulated to allow fastening of various items thereunder. The housing also carries a digital clock and electrical circuitry.

(C) The electrical circuitry includes first illumination means embedded within the clipboard structure itself as well as second illumination means within the housing itself and designed to illuminate the top surface of the clipboard from above. One or more batteries are contained within the housing and a switch mechanism is provided to allow differing alternatives of illumination as will be described in greater detail hereinafter.

As such, it is a first object of the present invention to provide an illuminated clipboard.

It is a further object of the present invention to provide such a device including a transparent clipboard which is internally illuminated.

It is a still further object of the present invention to provide such a device including a housing carrying a clock mechanism as well as a clip and electrical circuitry including two sets of illumination means.

These and other objects, aspects and features of the present invention will be better understood from the following detailed description of the preferred embodiment when read in conjunction with the appended drawing figures.

BRIEF DESCRIPTION OF THE DRAWINGS

FIG. 1 shows a top view of the present invention.

FIG. 2 shows a front view of the present invention.

FIG. 3 shows a side view of the present invention.

FIG. 4 shows a top view of just the board structure of the present invention.

FIG. 5 shows a cross-sectional view along the line V—V of FIG. 4.

FIG. 6 shows a side view of the inventive device with portions of the housing thereof removed to show detail.

FIG. 7 shows a rear view of the structure shown in FIG. 6.

FIG. 9 shows a schematic representation of the electrical circuitry of the present invention.

SPECIFIC DESCRIPTION OF THE PREFERRED EMBODIMENT

Figure 8:
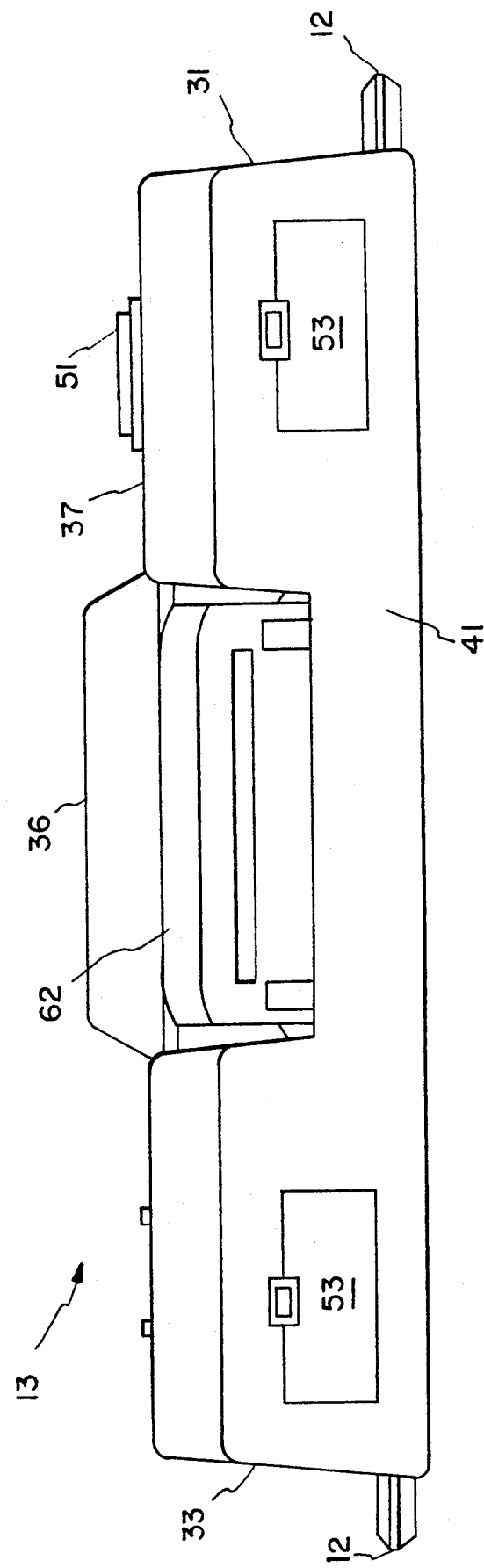
FIG. 8 shows a view similar to the view of FIG. 7, but with the housing included.

With reference, first, to FIGS. 1, 2 and 3, the present invention is generally designated by the reference numeral 10 and is seen to include a clipboard 11 on which is mounted a housing 13. The clipboard 11 has a top surface 15 and a bottom surface 17 with these surfaces lying in parallel planes. The periphery 19 of the board 11 consists of a top beveled edge 21 and a bottom beveled edge 23 meeting at an apex 25 with this configuration extending completely about the periphery of the board 11. The angle subtended between the edges 21 and 23 is specifically designed to create a prism specifically designed to create internal reflections of light within the board 11 since this angular relationship causes light shining within the board 11 to impinge on the surfaces 21, 23 at greater than the "critical angle". The board 11 is made of a transparent plastic material such as, for example, LUCITE, or some other acrylic plastic material. At the corners of the clipboard 11, angled corner portions 12 are provided to enhance internal reflections. Additionally at the corners of the clipboard adjacent the housing 13, holes 14, 16 are provided to facilitate hanging up of the device 10.

The housing 13 is seen to include side walls 31 and 33, top walls 35 and 37, front wall 39, rear wall 41 and bottom wall 43. A notch 45 in the housing 13 is designed to receive one end 12 of the board 11.

As shown in FIGS. 1-3, the housing 13 carries a digital clock mechanism 47 including a display 49 located on the top surface 35. Also located on the top surface 35 is a switch mechanism 51 while battery access doors 53 are provided on the rear wall 41 (FIG. 8). In the preferred embodiment, a pair of 1.5 volt batteries are contained behind each door 53 within the housing 13.

Most of the outer surfaces of the housing 13 are of an opaque color, however, transparent lenses 55 are provided in the housing 13, as best seen in FIG. 2, in a raised area 36 of the top surface 35. These lenses 55 contain respective lightbulbs 57, the operation of which will be described in greater detail hereinafter. These lightbulbs 57 have been described hereinabove as a "second illumination means".

With reference to FIGS. 4 and 5, a first illumination means consists of light emitting diodes 59 and 61 which are embedded in respective recesses 63 and 65 formed in the board 11. The light emitting diodes 59 and 61 may be activated by operation of the electrical circuitry of the present invention to illuminate the interior of the board 11.

With reference to FIG. 9, a preferred electrical circuitry design is shown. Shown in FIG. 8 are a source of power, namely batteries 3, the switch 51, the first illumination means 59, 61 and the second illumination means 57. Blocking diode 58 is also shown. As should be understood by those skilled in the art, the switch 51 is a three position double pole double throw (DPDT) switch with contacts 4, 5 and 6. The power source 9 is used to turn the lamps 57 on and off. The second power source 7 is used to power the LEDs 59, 61. The blocking diode 58 is associated with the second power source to preclude unintended illumination of the lamps 57. The commons are joined together at their individual sources as shown. The circuit functions in the following manner: with the switch in the center position, all illumination means 57, 59, 61 will be off; with the switch in a first pivoted position, the LEDs 59, 61 and the incandescent lamps 57 will be operating; with the switch in the second pivoted position, the LEDs 59, 61 only will be operating.

As shown in FIGS. 1, 2, 3, 6, 7 and 8, the housing 13 carries a clip generally designated by the reference numeral 60 and seen to include an actuating handle 62 as well as a clip member 63. As particularly seen in FIGS. 6 and 7, the clip 60 includes two depending members 66 and 67 suitably carried by the housing 13 and pivotably mounted on a rod 69.

A spring member 71 includes coiled portions 73 and 75, ends 77 and 79 bearing against the clip 60 and a middle portion 81 bearing against the board 11. In this way, the clip 60 is biased in a direction of rotation in a counterclockwise direction in the view of FIGS. 3 and 6. Thus, pivoting movements in the counterclockwise direction caused by pushing downwardly on the handle 61 move the clip 60 in opposition to the spring restoring force.

With the present invention having been described in great detail, its manner of operation should be self-evident. A piece of paper or other document may be placed on the surface 15 of the board 11 and may be retained in position there by the clip 60. Through actuation of the switch 51, the light emitting diodes 59 and 61 may be illuminated thereby causing light to emanate therefrom and into the interior of the board 11. Such light impinges on the edges 21, 23 of the board 11 at greater than the "critical angle" thereby causing a predominance of internal reflections causing the entirety of the interior of the board 11 to glow. Such glow tends to provide a lighted backdrop for a piece of paper or document maintained on the surface 15 of the board 11 to allow the user to write on the piece of paper or document even when the environment is otherwise dark.

If desired, alternatively, the switch 51 may be activated to a position wherein the light emitting diodes 59 and 61 as well as the lightbulbs 57 are illuminated. Thus, the lightbulbs 57 cause illumination of the document from above to enhance visibility.

When the batteries 3 are dead, they may easily be replaced by removing the access doors 53 and removing and replacing the batteries 3. Alternatively, the doors 53 may be eliminated and the entire rear wall 41 may be made removable.

As such, an invention has been disclosed in terms of a preferred embodiment thereof which fulfills each and every one of the objects of the present invention as set forth hereinabove and provides a new and useful illuminated clipboard of great novelty and utility.

Of course, various changes, modifications and alterations in the teachings of the present invention may be contemplated by those skilled in the art without departing from the intended spirit and scope thereof. As such, it is intended that the present invention only be limited by the term of the appended claims.

I claim:

1. An illuminated clipboard, comprising:
   (a) a board made of a transparent material, said board having double beveled edges extending completely about a peripheray thereof, said board having top and bottom continuous surfaces lying in parallel planes;
   (b) illumination means positioned within chamber means formed in said board between said top and bottom surfaces;
   (c) a source of power connected to said illumination means;
   (d) a clip mounted on said board and actuable to retain or release a document or paper with respect to said top surface;
   (e) said illumination means being operable to shine light within said board, said edges defining a prism causing light impinging thereona t an angle greater than a critical angle thereof to interreflect and substantially remain within said board.

2. The invention of claim 1, wherein said clip is carried by a housing mounted on said board.

3. The invention of claim 2, wherein said housing contains said source of power.

4. The invention of claim 3, wherein said housing carries an on-off switch electrically interconnected between said source of power and said illumination means.

5. The invention of claim 4, wherein said source of power comprises a battery.

6. The invention of claim 4, wherein said illumination means comprises first illumination means, and further including second illumination means in said housing and, when activated, shining light onto said top surface.

7. The invention of claim 6, wherein said first illumination means comprises a light emitting diode.

8. The invention of claim 6, wherein said switch has a first off position, a second position wherein solely said first illumination means is activated and a third position wherein said first and second illumination means are activated.

9. The invention of claim 6, wherein said second illumination means comprises two incandescent bulbs.

10. The invention of claim 1, wherein said clip is biased in a direction of retention of a said document or paper.

11. The invention of claim 2, wherein said housing carries a clock mechanism.

12. The invention of claim 4, wherein said on-off switch comprises a toggle switch.

13. The invention of claim 1, including at least one hole in said board for hanging said clipboard on a wall or other location.

14. The invention of claim 1, wherein said board periphery has angled non-perpendicular corners.

* * * * *